US006867392B1

(12) United States Patent  (10) Patent No.: US 6,867,392 B1
Howard  (45) Date of Patent: Mar. 15, 2005

(54) INFRARED ELEMENT AND OVEN

(76) Inventor: David Howard, 2403 E. 25 Pl., Tulsa, OK (US) 74114-3215

( * ) Notice: Subject to any disclaimer, the term of this patent is extended or adjusted under 35 U.S.C. 154(b) by 0 days.

(21) Appl. No.: 10/764,221

(22) Filed: Jan. 23, 2004

(51) Int. Cl.[7] .............................. A21B 1/22; A21B 1/48; F27B 9/36; F27D 11/02; H05B 3/42
(52) U.S. Cl. ........................ 219/388; 219/409; 219/411; 99/443 C
(58) Field of Search ................................ 219/388, 395, 219/406, 408, 409, 411; 99/386, 443 C; 373/117, 128–130, 134

(56) References Cited

U.S. PATENT DOCUMENTS

| | | | | | |
|---|---|---|---|---|---|
| 1,515,511 | A | * | 11/1924 | Milner | 373/130 |
| 3,475,592 | A | * | 10/1969 | Berkl | 219/388 |
| 3,729,570 | A | * | 4/1973 | Beck | 373/128 |
| 4,336,412 | A | * | 6/1982 | Thomander | 373/110 |
| 4,554,437 | A | | 11/1985 | Wagner et al. | |
| 4,960,977 | A | * | 10/1990 | Alden | 219/388 |
| 5,512,312 | A | | 4/1996 | Forney et al. | |
| 5,952,027 | A | | 9/1999 | Singh | |

OTHER PUBLICATIONS

"Application of Infra–red Radiation in Food Processing," Professor A.S. Ginzburg, Chemical and Process Engineering Series, 1969.
"Infra–Red Radiation for Food Processing II. Calculation of Heat Penetration During Infra–Red Frying of Meat Products," Magnus Dagerskog, , Lebensm.–Wiss u. Technol., 12, 252–257 (1979).

Heat Transfer and Food Products; Bengt Hallstron, et al., pp. 214–231, Elsevier Applied Science Publishers Ltd. 1988.
Infrared Radiative Drying in Food Engineering: A Process Analysis, Constantine Sandu, Biotechnology Progress (vol. 2, No. 3), Sep. 1986, pp. 109–119.
"Food Preservation by Hurdle–Technology," L. Leistner, H. Hechelmann, 1993 Food Preservation 2000 Conference, pp. 511–520.
"Shelf Life Extension and Pathogen Reduction of Fresh Chicken Through Surface Pasteurization Using Radiant Heat And Anti–Microbial Agents," MD. Mahbubul Islam, Dissertation submitted to the Graduate Faculty of The University of Georgia, Athen, Georgia, 1998.
"Post Processing Pasteurization of Processed Meats," E. Jeffery Rhodehamel and Scott W. Beckwith, American Meat Science Association.
Unitherm Food System, Inc., advertisement re "Smoking & Browning Under 10 minutes".
"Pasteurizing Protection," *The National Provisioner*, Apr. 1, 1999.
Studies on the Application of Infrared in Food Processing, Asselbergs, et al. presented at the 20th annual meeting, Institute of Food Technologists, May 17, 1960.
"Cooking Methods for Elimination of Salmonella typhimurium Experimental Surface Contaminant from Rare Dry–Roasted Beef Roasts," L.C. Blankenship, et al., *Journal of Food Science*, vol. 45, (1980).

* cited by examiner

Primary Examiner—Joseph Pelham
(74) *Attorney, Agent, or Firm*—Fellers, Snider, Blankenship, Bailey & Tippens, P.C.; Dennis D. Brown

(57) ABSTRACT

A continuous infrared oven and an infrared element therefor wherein the source and return terminals of the element are located on the same lateral side of the oven conveyor and are both accessible through the same oven side wall.

33 Claims, 5 Drawing Sheets

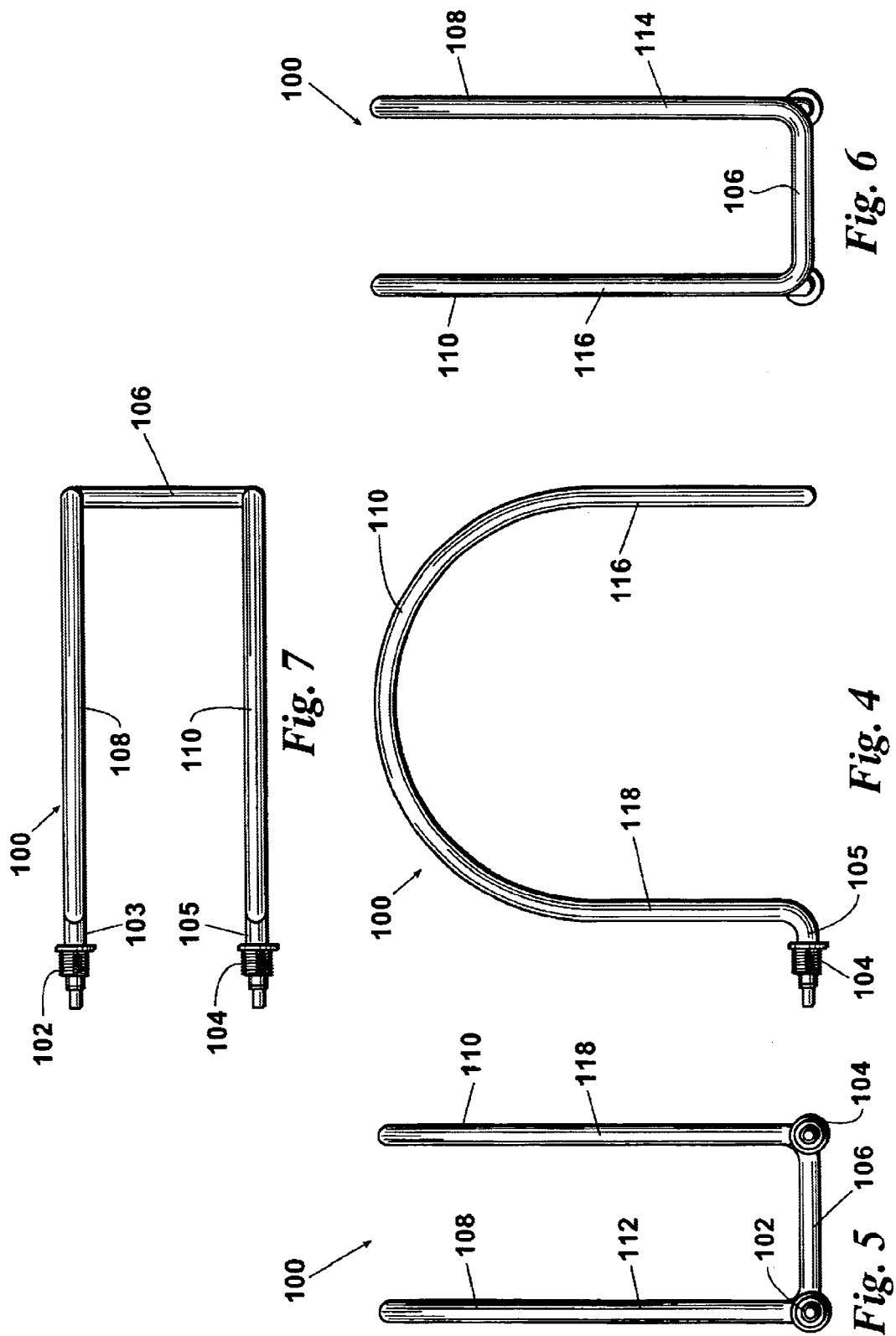

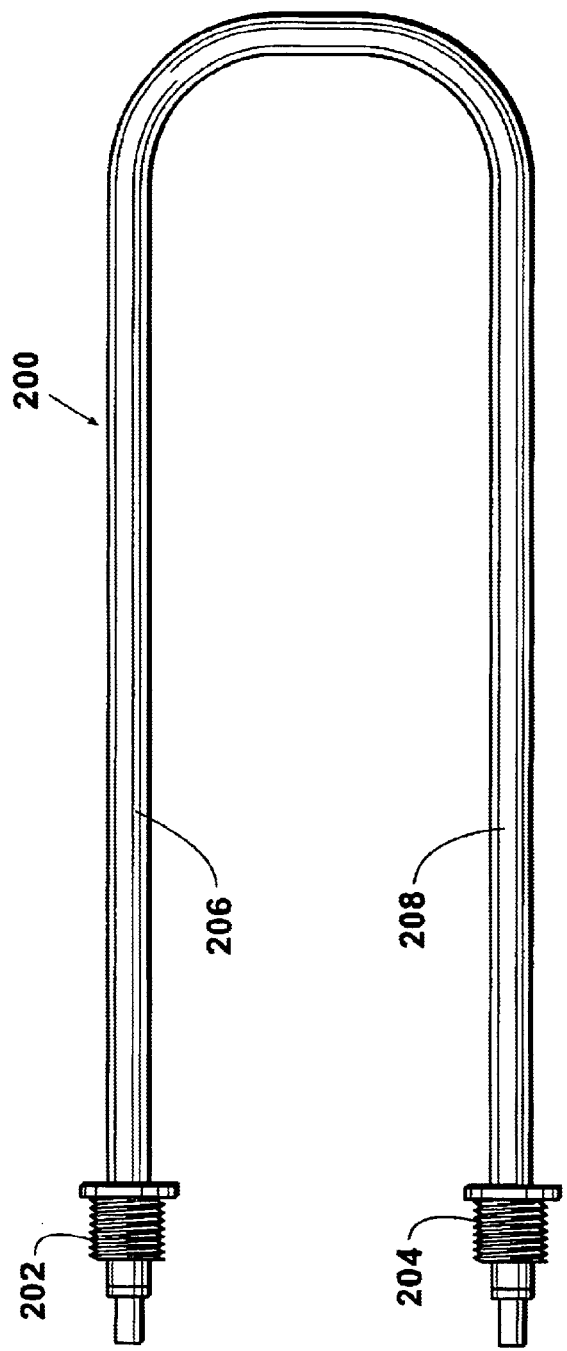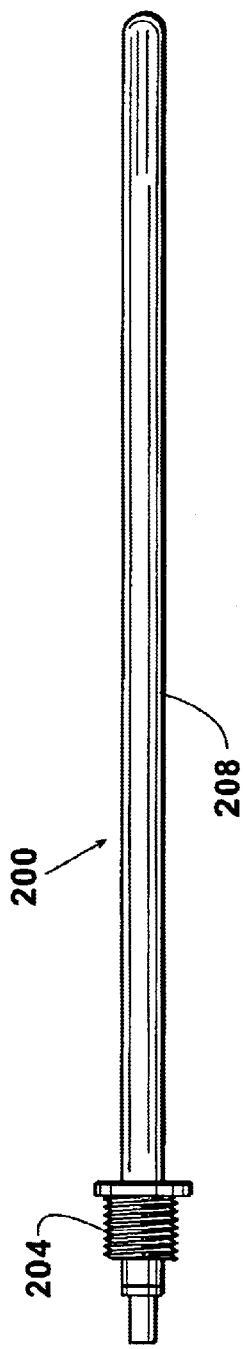
Fig. 8
Fig. 9

INFRARED ELEMENT AND OVEN

FIELD OF THE INVENTION

The present invention relates to improved infrared ovens and to improved infrared heating elements therefor.

BACKGROUND OF THE INVENTION

One example of an infrared oven heretofore used in the art is a continuous infrared oven available from Unitherm Food Systems, Inc. for removing purge material and free moisture from the surfaces of bag-cooked turkey breasts or hams prior to applying liquid smoke products or other browning liquids thereto. Another example of an infrared oven known in the art is a continuous infrared oven available from Unitherm Food Systems, Inc. for pasteurizing the surfaces of pre-cooked food products prior to packaging.

The continuous infrared ovens used in these applications typically comprise: an elongate insulated housing having inverted-U-shaped inlet and outlet openings; a conveyor (typically a stainless steel wire belt) having an upper carrying run extending longitudinally through the housing; and a series of inverted-U-shaped electrical infrared elements extending laterally over the conveyor carrying run.

The inverted-U-shaped infrared elements used in these systems have consisted of: a source terminal located on one lateral side of the conveyor; a return terminal located on the other lateral side of the conveyor; and an inverted-U-shaped element segment extending laterally over the conveyor from the source terminal to the return terminal. The inverted-U-shaped elements thus desirably surround and directly irradiate the upper surface and both side surfaces of the products and can be conveniently sized to allow even large products such as whole turkeys and hams to be conveyed through the oven without difficulty.

The Unitherm continuous infrared ovens used for surface pasteurization have also included a series of lower infrared elements extending laterally beneath the wire conveyor for directly irradiating the bottom surfaces of the products. These lower infrared elements have consisted of: a source terminal located on one lateral side of the conveyor; a return terminal located on the other lateral side of the conveyor; and a straight or slightly arched element segment extending beneath the belt from the source terminal to the return terminal.

The Unitherm continuous infrared ovens used heretofore for surface pasteurization have been of two basic types, single lane infrared ovens and dual lane infrared ovens. The dual lane ovens have been substantially identical to the single lane ovens except that the dual lane ovens have included a pair of conveyors. The dual conveyors extend side-by-side through the oven housing such that the lateral inner side of one conveyor is adjacent to the lateral inner side of the other conveyor. The upper and lower infrared heating elements used in the dual lane ovens have also been identical to those used in the single lane ovens so that each lane includes its own individual series of upper inverted-U-shaped elements above the belt and its own series of lower elements beneath the belt. Each of the upper and lower elements has a first terminal located on the outer lateral side of the belt and a second terminal located on the inner lateral side of the belt.

A need presently exists for an improved dual lane infrared oven and for improved infrared elements which can be used therein. It has been necessary heretofore that the inner end of each of the upper and lower elements used in each lane be installed, and that the necessary leads and connections therefore be directed to and provided within, the central interior portion of the oven. Such interior connections are not readily accessible and (a) significantly increase the complexity of the dual lane oven versus a single lane oven, (b) can require the use of materials capable of withstanding higher temperatures within the central part of the oven, (c) typically require that both processing lanes be shut down when a problem in one lane occurs, and (d) can make the oven more difficult to operate, repair, and maintain.

Previous attempts to address these shortcomings have not been successful. It has been suggested, for example, that, rather than each dual lane having its own individual series of upper infrared elements, a single series of wide upper infrared elements be used such that each element extends laterally over both conveyors. The wider elements would thus extend laterally across the entire oven such that the element source terminals would be located on the outer lateral side of one of the belts and the element return terminals would be located on the outer lateral side of the other belt. Unfortunately, the use of such elements results in (a) the inner sides of the products on each belt being shadowed by the products traveling down the other belt and/or (b) the upper infrared elements being much closer to the outer side of the product than to the innerside. Thus, the use of elements of this type would result in uneven, non-uniform irradiation and in inadequate heat transfer to the inner side of the product.

SUMMARY OF THE INVENTION

The present invention provides an improved infrared element and an improved dual lane continuous oven which satisfy the needs and alleviate the problems discussed above. The invention allows the element connections within the interior of the oven between the dual lanes to be eliminated and allows all of the elements in each lane to be installed and connected through an outer wall of the oven. Moreover, the present invention allows each individual conveyor lane to retain its own individual series of upper infrared elements arching from the outer lateral side to the inner lateral side of the conveyor. The direct irradiation of the products on each conveyor is therefore very consistent and uniform and cannot be blocked or shadowed by products traveling down the other conveyor. In addition, the present invention can improve the construction and operation of even a single lane oven by allowing all of the element connections to be made and accessed through one side of the housing.

In one aspect, the present invention provides an improved infrared element positionable over a conveyor wherein the element includes a source terminal and a return terminal and is configured to extend upwardly from a first lateral side of the conveyor and downwardly toward a second lateral side of the conveyor. The improvement to this infrared element comprises the source and return terminals being positioned adjacent to each other in a manner such that, when the infrared element is positioned over the conveyor, the source and return terminals will both be located on the first lateral side of the conveyor. The improvement further comprises the infrared element including an outgoing segment comprising: a source end having the source terminal thereon; an upwardly extending portion following the source end; and a downwardly extending portion following the upwardly extending portion. The improvement also comprises the infrared element including a return segment comprising: a return end having the return terminal thereon; a downwardly extending portion preceding the return end; and an upwardly extending portion preceding the downwardly extending portion of the return segment.

In another aspect, the present invention provides an improved infrared oven having a conveyor therein and a plurality of infrared elements over the conveyor wherein each of the infrared elements includes a source terminal and a return terminal and is shaped such that one portion extends upwardly from a first lateral side of the conveyor and another portion extends downwardly toward a second lateral side of the conveyor. The improvement comprises both the source terminal and the return terminal of each of the infrared elements being located on the first lateral side of the conveyor. The improvement preferably also comprises each of the infrared elements having (a) an outgoing segment extending from the source terminal and having a first portion extending upwardly away from the first lateral side of the conveyor and a second portion extending downwardly toward the second lateral side of the conveyor and (b) a return segment extending to the return terminal and having a first portion extending upwardly away from the second lateral side and a second portion extending downwardly toward the first lateral side of the conveyor.

In yet another aspect, the present invention provides an improved dual lane infrared oven including a first conveyor and a second conveyor, each of the conveyors having an outer lateral side and an inner lateral side and the conveyors extending side by side such that the inner side of the second conveyor is adjacent to the inner side of the first conveyor. The dual lane oven further includes a plurality of first conveyor infrared elements over the first conveyor and a plurality of second conveyor infrared elements over the second conveyor, each of the first and second conveyor infrared elements having a source terminal and a return terminal. Each of the first conveyor infrared elements is shaped such that one portion extends upwardly from the outer lateral side of the first conveyor and another portion extends downwardly toward the inner lateral side of the first conveyor. Similarly, each of the second conveyor infrared elements is shaped such that one portion extends upwardly from the outer lateral side of the second conveyor and another portion extends downwardly toward the inner lateral side of the second conveyor. The improvement to the dual lane infrared oven provided by the present invention comprises: (a) both the source terminal and the return terminal of each of the first conveyor infrared elements being located on the outer lateral side of the first conveyor and (b) both the source terminal and the return terminal of each of the second conveyor infrared elements being located on the outer lateral side of the second conveyor.

For each of the conveyors and upper infrared elements corresponding thereto in the improved dual lane infrared oven, the inventive improvement also preferably comprises each of the infrared elements having (a) an outgoing segment extending from the source terminal and having a first portion extending upwardly away from the outer lateral side of the conveyor and a second portion extending downwardly toward the inner lateral side of the conveyor and (b) a return segment extending to the return terminal having a first portion extending upwardly away from the inner lateral side of the conveyor and a second portion extending downwardly toward the outer lateral side of the conveyor.

Further aspects, features, and advantages of the present invention will be apparent to those skilled in the art upon examining the accompanying drawings and upon reading the following detailed description of the preferred embodiments.

BRIEF DESCRIPTION OF THE DRAWINGS

FIG. 4 is an elevational side view of an embodiment 100 of the upper infrared element provided by the present invention.

FIG. 5 is an elevational proximal end view of inventive infrared element 100.

FIG. 6 is an elevational distal end view of inventive infrared element 100.

FIG. 7 is a plan view of inventive infrared element 100.

FIG. 8 is a plan view of an embodiment 200 of the lower infrared element provided by the present invention.

FIG. 9 is an elevational side view of inventive lower infrared element 200.

DETAILED DESCRIPTION OF THE PREFERRED EMBODIMENTS

Figure 1:
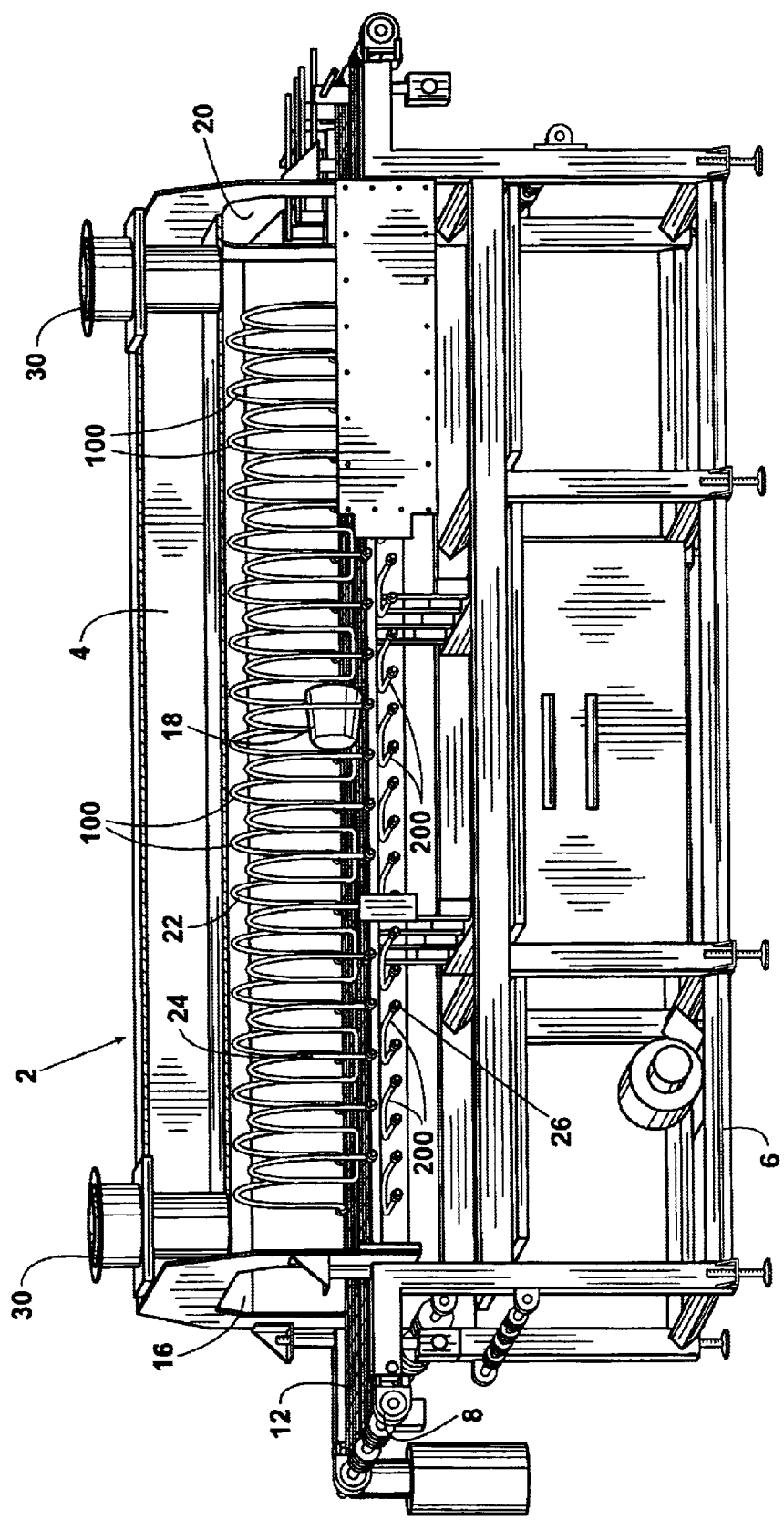
FIG. 1 is a perspective view of an embodiment 2 of the dual lane infrared oven provided by the present invention.
Figure 2:
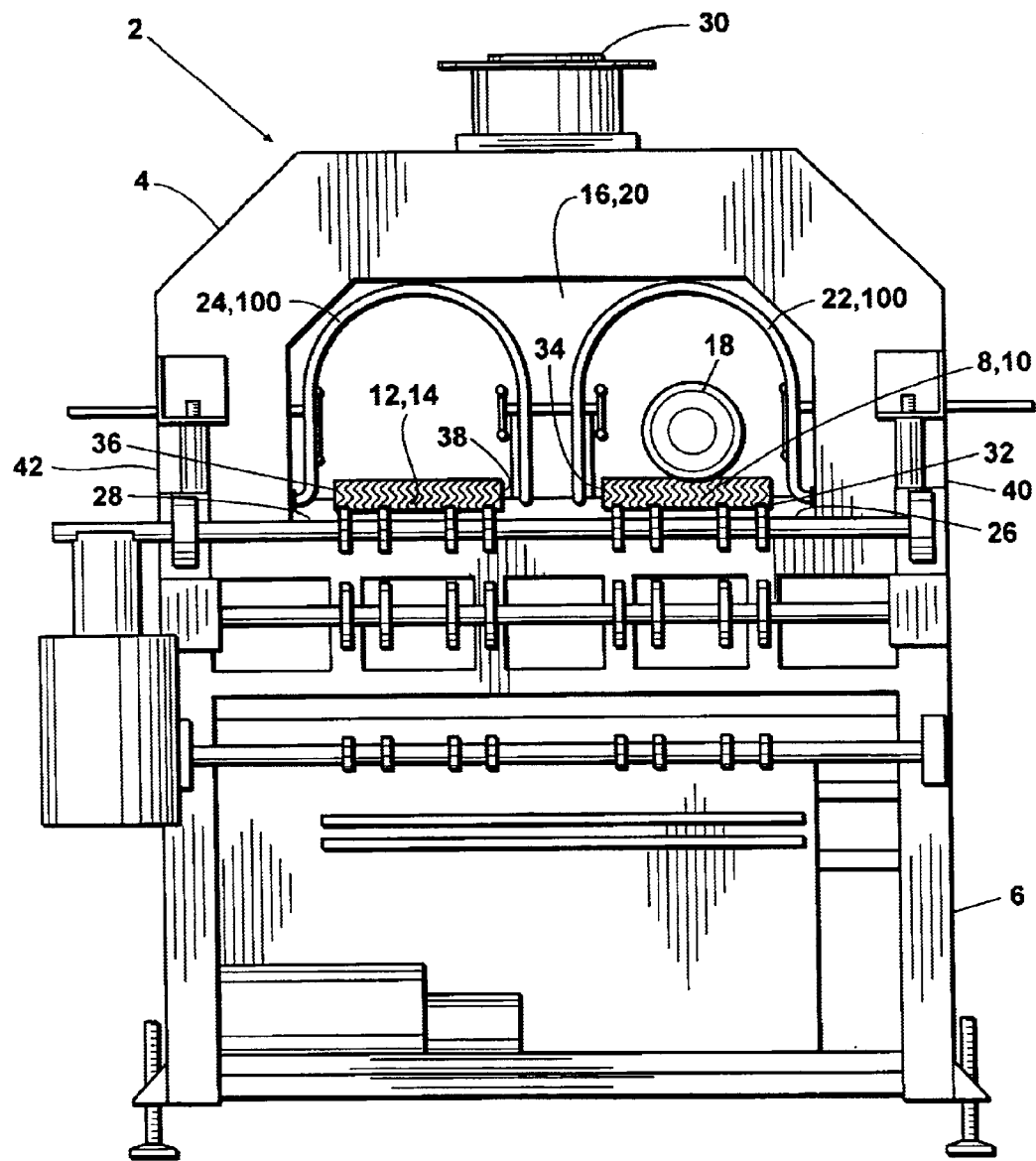
FIG. 2 is an elevational end view of inventive dual lane oven 2.
Figure 3:
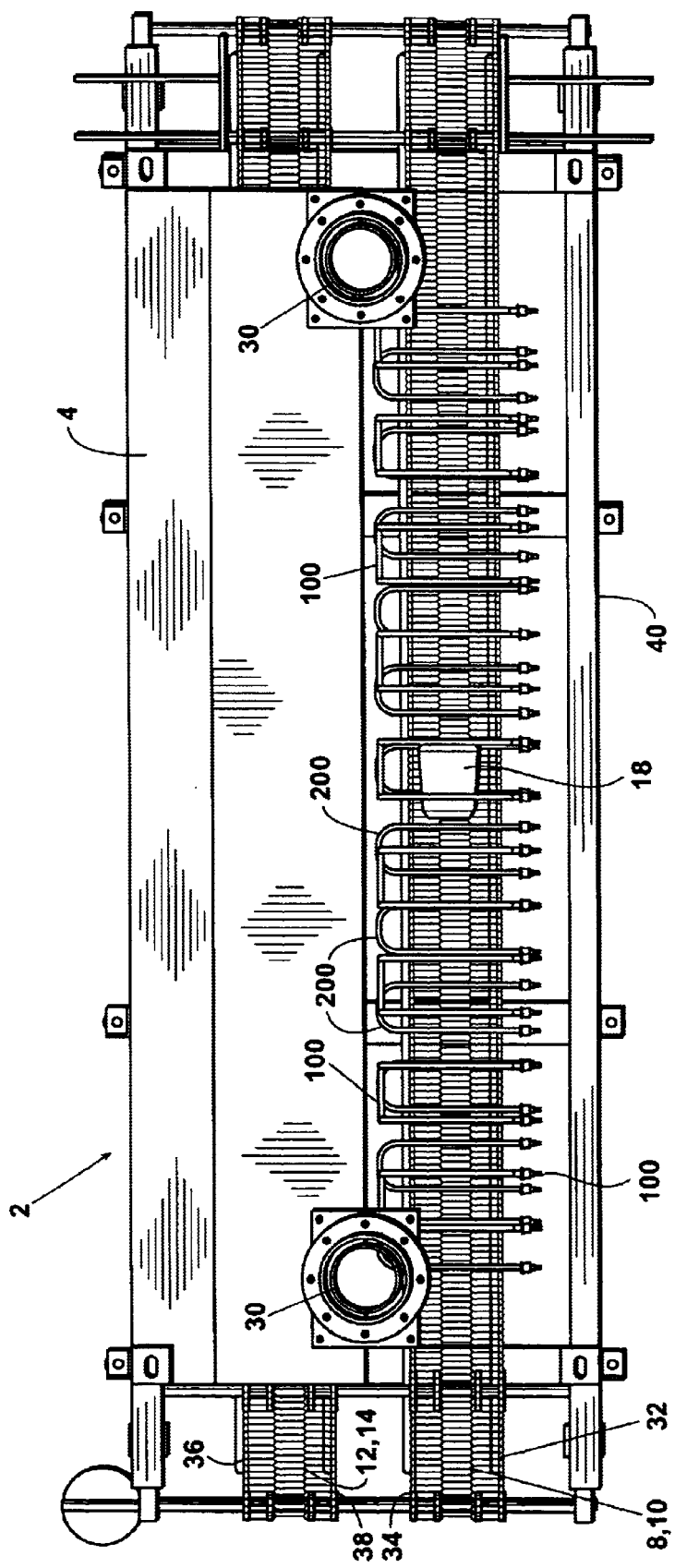
FIG. 3 is a plan view of inventive dual lane oven 2.

An embodiment 2 of an improved dual lane infrared oven provided by the present invention is shown in FIGS. 1–3. The inventive dual lane oven 2 comprises: an elongate insulated housing 4 supported on a frame 6; a first conveyor 8 having a horizontal upper carrying run 10 which extends longitudinally through housing 4; a second conveyor 12 having a horizontal upper carrying run 14 which extends longitudinally through housing 4; a wide, inverted-U-shaped, inlet end opening in housing 4 for delivering products 18 to both of conveyors 8 and 12; a wide, inverted-U-shaped, outlet end opening 20 in housing 4 through which products 18 from both of conveyors 8 and 12 are delivered; a series 22 of lateral inventive upper infrared elements 100 positioned over the carrying run 10 of conveyor 8; a series 24 of lateral inventive upper infrared elements 100 positioned above the upper carrying run 14 of conveyor 12; a series 26 of lateral inventive lower infrared elements 200 positioned below the first conveyor carrying run 10; a series 28 of lateral inventive lower infrared elements positioned below the second conveyor carrying run 14; and overhead ducts 30 provided in housing 4 above the inlet and outlet openings 16 and 20 for venting hot air from the oven so that it does not otherwise escape into and heat the area surrounding oven 2.

Conveyors 8 and 12 can each be generally any type of oven conveyor used in the art. However, for most applications, conveyors 8 and 12 will each preferably be a stainless steel wire belt or other type of open belt which will allow the infrared energy from lower infrared elements 200 to directly irradiate the lower surfaces of the products 18. As will be understood, inventive oven 2 preferably includes a belt washer 32 of a type known in the art positioned beneath housing 4 for cleaning the return runs of conveyors 8 and 12, preferably using a high pressure water spray or other media effective for discharging cinders and other particles from the belts.

The carrying run 10 of first conveyor 8 extends longitudinally through housing 4 and has an outer lateral side 32 and an inner lateral side 34. Similarly, the upper carrying run 14 of second conveyor 12 extends longitudinally through housing 4 and has an outer lateral side 36 and an inner lateral side 38. As illustrated in FIG. 2, first conveyor carrying run 10 and the second conveyor carrying run 14 preferably run side-by-side through housing 4 such that the respective inner lateral sides 34 and 38 thereof are adjacent to each other. In this relationship, the outer lateral side 32 of first conveyor carrying run 10 is positioned adjacent to side wall 40 of oven housing 4 and the outer lateral side 36 of second conveyor carrying run 14 is positioned adjacent to the opposite side wall 42 of the oven housing.

The embodiment 100 of the inventive upper infrared element used in oven 2 is shown in FIGS. 4–7. The inventive upper infrared element 100 can be an electrical or gas infrared element and will preferably be electrical. The inventive upper element 100 comprises: a source terminal 102 and a return terminal 104 which are preferably adjacent to each other and are co-directional or otherwise directed so that, when installed in oven 2 over either of the conveyor carrying runs 10 or 14, both the source terminal 102 and the return terminal 104 will be located on the outer lateral side 32 or 36 of the carrying run 10 or 14 and will both be accessible through the same side wall 40 or 42 of the oven housing.

The inventive upper infrared element 100 further comprises: a distal turn-around portion 106 which will be positioned on the inner lateral side 34 or 38 of the conveyor carrying run; an outgoing element segment 108 having the source terminal 102 on an initial end portion 103 thereof and extending laterally over the conveyor carrying run 10 or 14 to the distal turn-around portion 106; and a return element segment 110 having the return terminal 104 on a terminal end portion 105 thereof and extending laterally over conveyor carrying run 10 or 14 from the distal turn-around portion 106. In order to allow the products 18 to pass beneath the upper infrared elements 100 and to provide direct and uniform irradiation of the top and side surfaces of the products, the outgoing segment 108 of element 100 is preferably shaped to include an initial portion 112 which will extend upwardly away from the lateral outer side 32 or 36 of the conveyor carrying run 10 or 14 followed by a second portion 114 which will extend downwardly toward the inner lateral side 34 or 38 of the conveyor. Similarly, the return segment 110 will preferably include a first portion 116 which will extend upwardly away from the inner lateral side 34 or 38 of the conveyor followed by a second portion 118 which will extend downwardly toward the outer lateral side 32 or 36.

The distal turn-around portion 106 of inventive upper element 100 can be a substantially straight, horizontal segment as shown in FIGS. 5–7 or it can be a segment which is continuously curved or has any other shape effective for transitioning from the distal end of outgoing segment 108 to the initial end of return segment 110. A substantially straight turn-around segment 106 of the type shown in FIGS. 5–7 allows the outgoing segment 108 and the return segment 110 to extend over the conveyor carrying run in a consistent, parallel spaced relationship all the way to the inner lateral side of the conveyor and is therefore preferred for use in the present invention.

To provide consistent and uniform heating and irradiation, the inventive upper infrared element 100 is preferably symmetrical or otherwise configured such that the return segment 110 is substantially a mirror image of outgoing segment 108. Outgoing segment 108 and return segment 110 will also preferably be spaced apart from and parallel to each other and will each preferably be perpendicular to the carrying run 10 or 14 of the conveyor.

The shape of the outgoing and return segments 108 and 110 can be rectangular, continuously arched, or any other shape effective for irradiating the tops and sides of products 18 while allowing the products to travel through the oven. In order to most effectively surround the products 18 laterally and provide uniform spacing for the direct irradiation of the top and both sides of the product, the outgoing and return segments 108 and 110 will most preferably have an inverted-U-shape. In addition, the upper portion of the inverted-U-shape will preferably be a smooth (preferably semicircular) arch as illustrated in FIG. 2.

Embodiment 200 of the lower infrared element provided by the present invention is shown in FIGS. 8 and 9. As with the inventive upper infrared element 100, the inventive lower infrared element 200 preferably includes a source terminal 202 and a return terminal 204 which are adjacent to each other and are co-directional or otherwise directed such that, when installed in inventive oven 2 beneath the conveyor carrying run 10 or 14, the source terminal 202 and the return terminal 204 will each be located on the outer lateral side 32 or 38 of the conveyor and will be accessible through the same side wall 40 or 42 of housing 4. To provide consistent uniform heating and irradiation across the bottom of the belt, the inventive lower infrared element 200 preferably comprises a straight outgoing segment 206 and a straight return segment 208 which will extend laterally beneath the conveyor carrying run in a spaced, parallel relationship.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. In an infrared element positionable over a conveyor wherein said infrared element includes a source terminal and a return terminal and is configured to extend upwardly from a first lateral side of said conveyor and downwardly toward a second lateral side of said conveyor, the improvement comprising:

said source and said return terminals being positioned adjacent to each other in a manner such that, when said infrared element is positioned over said conveyor, said source and said return terminals will both be located on said first lateral side of said conveyor;

said infrared element including an outgoing segment comprising a source end having said source terminal thereon, an upwardly extending portion following said source end, and a downwardly extending portion following said upwardly extending portion; and said infrared element including a return segment comprising a return end having said return terminal thereon, a downwardly extending portion preceding said return end, and an upwardly extending portion preceding said downwardly extending portion of said return segment.

2. The infrared element of claim 1 wherein the improvement further comprises said infrared element having a distal turn-around portion such that said outgoing segment extends from said source terminal to said distal turn-around portion and said return segment extends from said distal turn-around portion to said return terminal.

3. The infrared element of claim 1 wherein the improvement further comprises said infrared element being substantially symmetrical such that said return segment is substantially a mirror image of said outgoing segment.

4. The infrared element of claim 1 wherein the improvement further comprises said outgoing and said return segments being spaced apart from and substantially parallel to each other.

5. The infrared element of claim 1 wherein the improvement further comprises at least an upper portion of each of said outgoing and said return segments being arched.

6. The infrared element of claim 1 wherein the improvement further comprises at least an upper portion of each of said outgoing and said return segments being semicircular.

7. The infrared element of claim 1 wherein the improvement further comprises each of said outgoing and said return segments having an inverted-U-shape.

8. The infrared element of claim 7 wherein the improvement further comprises said outgoing and said return segments being spaced apart from and substantially parallel to each other.

9. The infrared element of claim 7 wherein the improvement further comprises each of said outgoing and said return segments having a semicircular upper portion.

10. In an infrared oven having a conveyor therein and a plurality of infrared elements over said conveyor wherein each of said infrared elements includes a source terminal and a return terminal and is shaped such that one portion extends upwardly from a first lateral side of said conveyor and another portion extends downwardly toward a second lateral side of said conveyor, the improvement comprising both said source terminal and said return terminal of each of said infrared elements being located on said first lateral side of said conveyor.

11. The infrared oven of claim 10 wherein the improvement further comprises each of said infrared elements having:
   an outgoing segment extending from said source terminal and having a first portion extending upwardly away from said first lateral side of said conveyor and a second portion extending downwardly toward said second lateral side of said conveyor and
   a return segment extending to said return terminal and having a first portion extending upwardly away from said second lateral side and a second portion extending downwardly toward said first lateral side of said conveyor.

12. The infrared oven of claim 11 wherein the improvement further comprises each of said infrared elements having a distal turn-around portion such that said outgoing segment extends from said source terminal to said distal turnaround portion and said return segment extends from said distal turn-around portion to said return terminal.

13. The infrared oven of claim 12 wherein the improvement further comprises said distal turn-around portion of each of said infrared elements being located on said second lateral side of said conveyor.

14. The infrared oven of claim 11 wherein the improvement further comprises said infrared element being substantially symmetrical such that said return segment is substantially a mirror image of said outgoing segment.

15. The infrared oven of claim 11 wherein the improvement further comprises said outgoing and said return segments being spaced apart from and substantially parallel to each other.

16. The infrared oven of claim 11 wherein the improvement further comprises at least an upper portion of each of said outgoing and said return segments being arched.

17. The infrared oven of claim 11 wherein the improvement further comprises at least an upper portion of each of said outgoing and said return segments being semicircular.

18. The infrared oven of claim 11 wherein the improvement further comprises each of said outgoing and said return segments having an inverted-U-shape.

19. The infrared oven of claim 18 wherein the improvement further comprises said outgoing and said return segments being spaced apart from and substantially parallel to each other.

20. The infrared oven of claim 18 wherein the improvement further comprises each of said outgoing and said return segments having a semicircular upper portion.

21. The infrared oven of claim 11 wherein said infrared elements are upper infrared elements and the improvement further comprises a plurality of lower infrared elements positioned below said conveyor, each of said lower infrared elements having a source terminal and a return terminal and both said source terminal and said return terminal of each of said lower infrared elements being located on said first lateral side of said conveyor.

22. In a dual lane infrared oven including a first conveyor and a second conveyor, each of said conveyors having an outer lateral side and an inner lateral side and said conveyors extending side-by-side such that said inner lateral side of said second conveyor is adjacent to said inner lateral side of said first conveyor, and said dual lane infrared oven further including a plurality of first conveyor infrared elements over said first conveyor and a plurality of second conveyor infrared elements over said second conveyor, each of said first and said second conveyor infrared elements having a source terminal and a return terminal, each of said first conveyor infrared elements being shaped such that one portion extends upwardly from said outer lateral side of said first conveyor and such that another portion extends downwardly toward said inner lateral side of said first conveyor and each of said second conveyor infrared elements being shaped such that one portion extends upwardly from said outer lateral side of said second conveyor and such that another portion extends downwardly toward said inner lateral side of said second conveyor, the improvement comprising:
   both said source terminal and said return terminal of each of said first conveyor infrared elements being located on said outer lateral side of said first conveyor and
   both said source terminal and said return terminal of each of said second conveyor infrared elements being located on said outer lateral side of said second conveyor.

23. The dual lane infrared oven of claim 22 wherein the improvement further comprises:
   each of said first conveyor infrared elements having
      an outgoing segment extending from said source terminal and having a first portion extending upwardly away from said outer lateral side of said first conveyor and a second portion extending downwardly toward said inner lateral side of said first conveyor and
      a return segment extending to said return terminal and having a first portion extending upwardly away from said inner lateral side of said first conveyor and a second portion extending downwardly toward said outer lateral side of said first conveyor and
   each of said second conveyor infrared elements having
      an outgoing segment extending from said source terminal and having a first portion extending upwardly away from said outer lateral side of said second conveyor and a second portion extending downwardly toward said inner lateral side of said second conveyor and
      a return segment extending to said return terminal and having a first portion extending upwardly away from said inner lateral side of said second conveyor and a second portion extending downwardly toward said outer lateral side of said second conveyor.

24. The dual lane infrared oven of claim 23 wherein the improvement further comprises each of said first and said second conveyor infrared elements having a distal turn-around portion such that said outgoing segment extends from said source terminal to said distal turn-around portion and said return segment extends from said distal turn-around portion to said return terminal.

25. The dual lane infrared oven of claim 24 wherein the improvement further comprises said distal turn-around portion of each of said first conveyor infrared elements being located on said inner lateral side of said first conveyor and said distal turn-around portion of each of said second conveyor infrared elements being located on said inner lateral side of said second conveyor.

26. The dual lane infrared oven of claim 23 wherein the improvement further comprises each of said first and said second conveyor infrared elements being substantially symmetrical such that said return segment is substantially a mirror image of said outgoing segment.

27. The dual lane infrared oven of claim 23 wherein the improvement further comprises said outgoing and said return segments of each of said first and said second conveyor infrared elements being spaced apart from and substantially parallel to each other.

28. The dual lane infrared oven of claim 23 wherein the improvement further comprises at least an upper portion of each of said outgoing and said return segments of said first and said second conveyor infrared elements being arched.

29. The dual lane infrared oven of claim 23 wherein the improvement further comprises at least an upper portion of each of said outgoing and said return segments of said first and said second conveyor infrared elements being semicircular.

30. The dual lane infrared oven of claim 23 wherein the improvement further comprises each of said outgoing and said return segments of said first and said second conveyor infrared elements having an inverted-U-shape.

31. The dual lane infrared oven of claim 30 wherein the improvement further comprises said outgoing and said return segments of each of said first and said second conveyor infrared elements being spaced apart from and substantially parallel to each other.

32. The dual lane infrared oven of claim 30 wherein the improvement further comprises each of said outgoing and said return segments having a semicircular upper portion.

33. The dual lane infrared oven of claim 23 wherein said first and said second conveyor infrared elements are upper infrared elements and the improvement further comprises a plurality of first conveyor lower infrared elements positioned below said first conveyor and a plurality of second conveyor lower infrared elements positioned below said second conveyor, each of said first and said second conveyor lower infrared elements having a source terminal and a return terminal, both said source terminal and said return terminal of each of said first conveyor lower infrared elements being located on said outer lateral side of said first conveyor, and both said source terminal and said return terminal of each of said second conveyor lower infrared elements being located on said outer lateral side of said second conveyor.

\* \* \* \* \*